Dec. 18, 1951 G. CHAUSSON 2,578,671
VEHICLE
Filed Dec. 1, 1945 2 SHEETS—SHEET 1
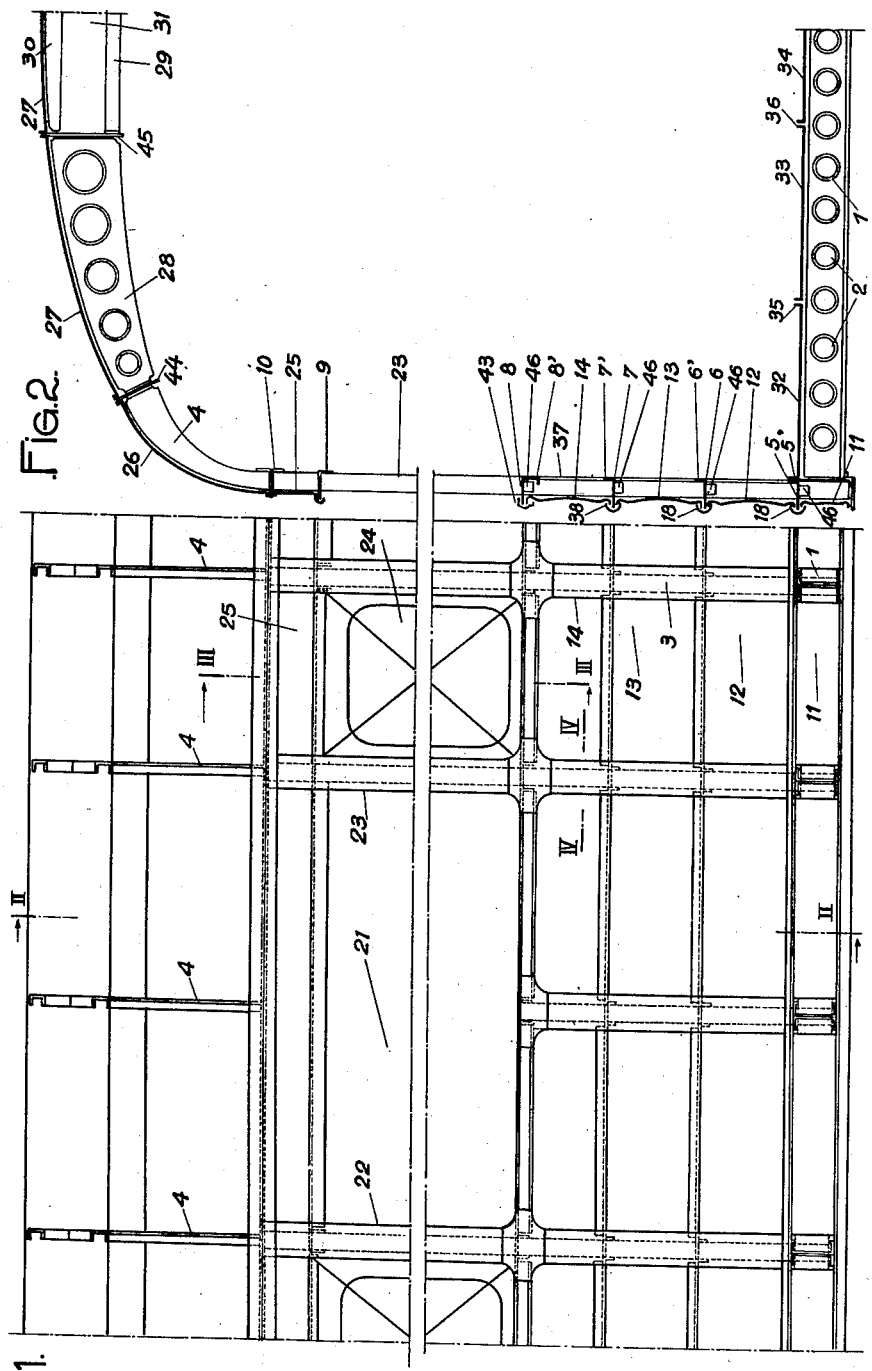
INVENTOR:
GASTON CHAUSSON
BY Leon M. Strauss
AGT.

Dec. 18, 1951 G. CHAUSSON 2,578,671
VEHICLE
Filed Dec. 1, 1945 2 SHEETS—SHEET 2
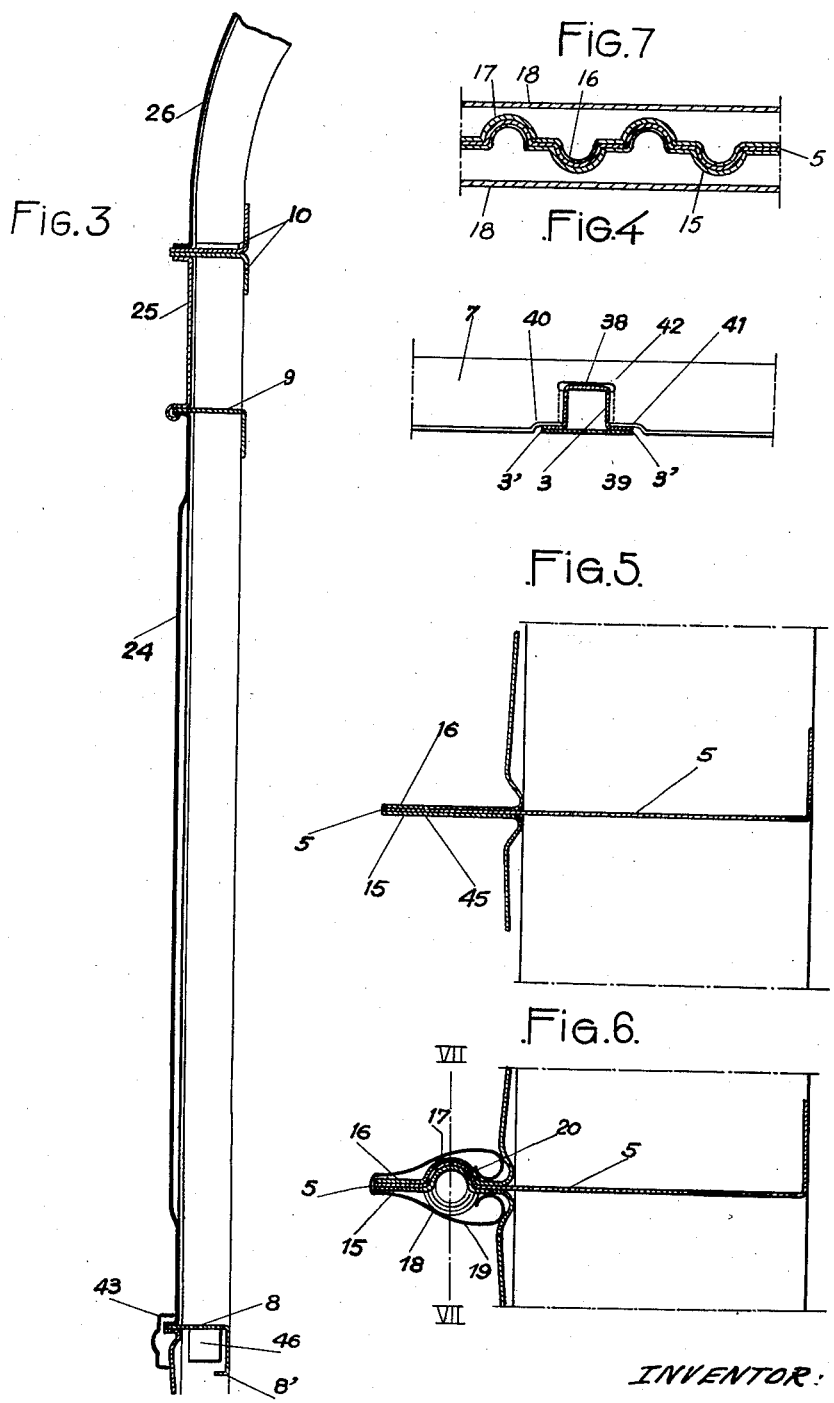
INVENTOR:
GASTON CHAUSSON
BY Leon M. Strauss Patented Dec. 18, 1951

2,578,671

UNITED STATES PATENT OFFICE 2,578,671

VEHICLE

Gaston Chausson, Asnieres, France, assignor to Societe Anonyme des Usines Chausson, Asnieres, France, a company of France Application December 1, 1945, Serial No. 632,260
In France January 24, 1945

5 Claims. (Cl. 105—397)

The present invention refers to a vehicle construction and one of its objects is to provide means affording the formation of a truly tubular vehicle body and conferring on the latter a great moment of inertia and a great resistance to all deflection stresses.

The vehicle according to the invention can be built in a particularly advantageous manner as a railway car, but it can also be produced as a road vehicle.

A vehicle in accordance with the invention essentially comprises a body constituted by a braced framework which is composed of frames connected by longitudinal ribs or reinforcing members, and by longitudinal panels of sheet-metal extending from one end to the other of said body between the ribs with which they are assembled. Said longitudinal metal strips or panels are provided along their side edges with bent flanges which are applied against the edges or extensions of the ribs with which they are assembled.

According to a particularly economical form of embodiment, the longitudinal sheet-metal strips forming the outer skin or covering of the body are slightly curved crosswise.

Further features and advantages of the invention will be gathered from the following specification and from the drawings, in which the invention is illustrated by way of example:

Fig. 1 is a partial side elevation of a wall of a vehicle body made according to the invention.

Fig. 2 is a section taken along line II—II of Fig. 1.

Fig. 3 is a section drawn to a larger scale and taken along line III—III of Fig. 1.

Fig. 4 is a section taken along line IV—IV of Fig. 1.

Fig. 5 is a view in detail, drawn to a larger scale, of a butt-strap assembly of metal sheets.

Fig. 6 is a sectional view similar to that of Fig. 5 but somewhat modified.

Fig. 7 is a vertical, longitudinal section taken along line VII—VII of Fig. 6.

The braced framework of the vehicle is essentially constituted by frames composed of a traverse bottom beam 1 provided with openings or hollows 2, for the reduction of weight to which is connected on either end an upright or corner post 3, said uprights being in turn connected to each other by a roof member 4. These frames are connected to one another by longitudinal reinforcing ribs or members 5, 6, 7, 8, 9 and by canopy trestle 10.

Longitudinal sheet-metal strips or panel sections 11, 12, 13, 14 extend longitudinally, for instance from one end to the other of the vehicle, between said reinforcing ribs 5, 6, 7. Said strips are bent at their edges to form flanges 15, 16 (Figs. 5 and 6) between which lie the marginal extension of longitudinal rib 5. The three flat elements of metal sheets 15, 16 and 5 are assembled and joined together by means of roller weld 45 (Fig. 5) ensuring perfect leak tightness of this joint. Further, at intervals there are added to the three sheet layers composed of the two flanges 15, 16 and of rib extension 5, stampings 17 (Fig. 6) arranged in alternating relation on one side, and on the other side of this joint. Also positioned adjacent this joint are butt-straps 18 constituted by suitably bent sheet metal which elastically grip, by means of their bent clamping portions 19, 20, below stampings 17. Butt-strap 18 is preferably filled with a leak proofing agent (not shown), such as paint incorporating a loading of graphite, etc.

Fig. 7 shows a vertical, longitudinal sectional view, parallel to the car side wall and taken through the maximum diametrical portion of stamping member 17, as seen in Fig. 6.

Above sheet-metal panel section 11, 12, 13, 14 are provided bays 21 which are positioned between two uprights 22, 23. In the intervals between said bays, panels 24 are disposed, preferably slightly bulged, as shown in Fig. 3, to provide for necessary stiffness. A moulding 25 is positioned above bays 21 and panels 24 between the connecting ribs 9 and the canopy trestle 10.

A sheet-metal shell 26 forms the curved edge of the canopy which is completed by metal sheet pieces 27 covering the frames. The roof arch is preferably broken at the top and completed by two half-members 29, 30 providing between them a shaft 31 for the circulation of heated air. Longitudinal reinforcing plates 44, 47 are arranged between canopy members 4, 28, 29, 30 and assembled to the metal sheet pieces 27 of the covering by roller welding of the flanges, similar to the side strips or panels 11, 12, 13, 14, with or without butt-straps.

As shown in Fig. 2, the cross-members 1 support a flooring constituted by metal sheets 32, 33, 34 joined together by welds 35, 36.

In addition an inner wall 37 is placed on the bent flanges 5', 6', 7', 8', 9' of the longitudinal reinforcing ribs or members. Said inner wall may advantageously be made of a panel of insulating material.

The longitudinal ribs are preferably uninterrupted units which provide at right angles to uprights 3 a recess for accommodating said uprights, as shown in Fig. 4. Those portions of the ribs slit for the purpose of forming said recesses are preferably folded to one side to form flaps 46 serving to secure the aforesaid ribs by welding to the sides of uprights 3, 22, 23. It will be seen that uprights 3 are suitably profiled and are positioned in the recesses of the reinforcing ribs at the bottom of which is a layer of felt 38 for preventing noise. The open side of the uprights is closed by a cover plate 39. The flanges 3', 3'' of the uprights and the cover plate 39 are embedded in recesses 40, 41 of the rib, in such a manner as not to protrude beyond said rib.

The continuity of the reinforcing rib is ensured by portion 42 of said rib provided at the bottom of the recess into which the upright is embedded.

It is likewise possible to cut the ribs or reinforcing members into sections of the same length as the space included between two uprights and to weld them at their ends to replace portions 42 left according to Fig. 4 to ensure continuity.

The continuous longitudinal sheet metal panels 11, 12, 13, 14 are preferably slightly curved in vertical direction or crosswise, as shown in Fig. 2. The butt-straps 18 positioned between the sheet metal panels give the appearance of ornamental beadings. A wider belt rail 43 positioned at the upper portion of the panels below the bays further improves the aesthetic appearance of the body structure.

The vehicle body thus constituted comprises a real tubular body endowed with a great moment of inertia and a powerful resistance against all deflection stresses. The method of construction according to the invention permits of an extremely light construction and the continuous sheet metal strips or panels separated by the butt-straps forming beadings, likewise confer on this vehicle, in addition to the technical advantages set forth hereinabove, a very particular aesthetic appearance.

What I claim and desire to secure by Letters Patent of the United States is:

1. A frame structure for a vehicle body comprising a plurality of spaced, substantially vertically directed frames each including a bottom beam, a lateral upright wall post extending from said beam at each end thereof, and a roof member supported by said upright posts, longitudinal reinforcing ribs rigidly connecting adjacent upright posts, respectively, and terminating each in a substantially flat extension projecting outwardly and beyond said posts, longitudinal metal panel sections located between said ribs and terminating each in marginal outwardly bent flanges, each two adjacent flanges being arranged to be flush on either side of each rib extension, each rib extension being secured to the respective two flanges to thereby form a unitary member, and elastic gripping means extending over each unitary member and in engagement with said bent flanges to cover the same and its rib extension.

2. A vehicle body according to claim 1, wherein said gripping means are cap-shaped to form moldings and terminate in curved edges, said edges removably engaging said flange of said unitary members.

3. A vehicle body according to claim 1, wherein bays are arranged to extend between predetermined upright posts, and stiffened sheet metal panels between said bays.

4. A vehicle body according to claim 1, wherein said reinforcing ribs are provided with recesses for accommodating therein said upright posts, respectively.

5. A vehicle body according to claim 4, wherein said upright posts are U-shaped in cross-section, and cover plates flush with said reinforcing ribs, respectively, for closing said recesses.

GASTON CHAUSSON.

REFERENCES CITED

The following references are of record in the file of this patent:

UNITED STATES PATENTS

| Number | Name | Date |
| --- | --- | --- |
| 1,638,019 | Small | Aug. 9, 1927 |
| 2,054,783 | Gilpin | Sept. 15, 1936 |
| 2,078,787 | Baker | Apr. 27, 1937 |
| 2,150,130 | Ragsdale et al. | Mar. 7, 1939 |
| 2,171,425 | Dean et al. | Aug. 29, 1939 |
| 2,208,450 | Dietrich | July 16, 1940 |
| 2,223,746 | Stoner | Dec. 3, 1940 |
| 2,246,499 | Blomberg | June 24, 1941 |
| 2,256,494 | Ragsdale et al. | Sept. 23, 1941 |
| 2,280,318 | Steuber | Apr. 21, 1942 |